C. J. N. REBOUR.
Car-Trucks.
No. 154,280.                              Patented Aug. 18, 1874.
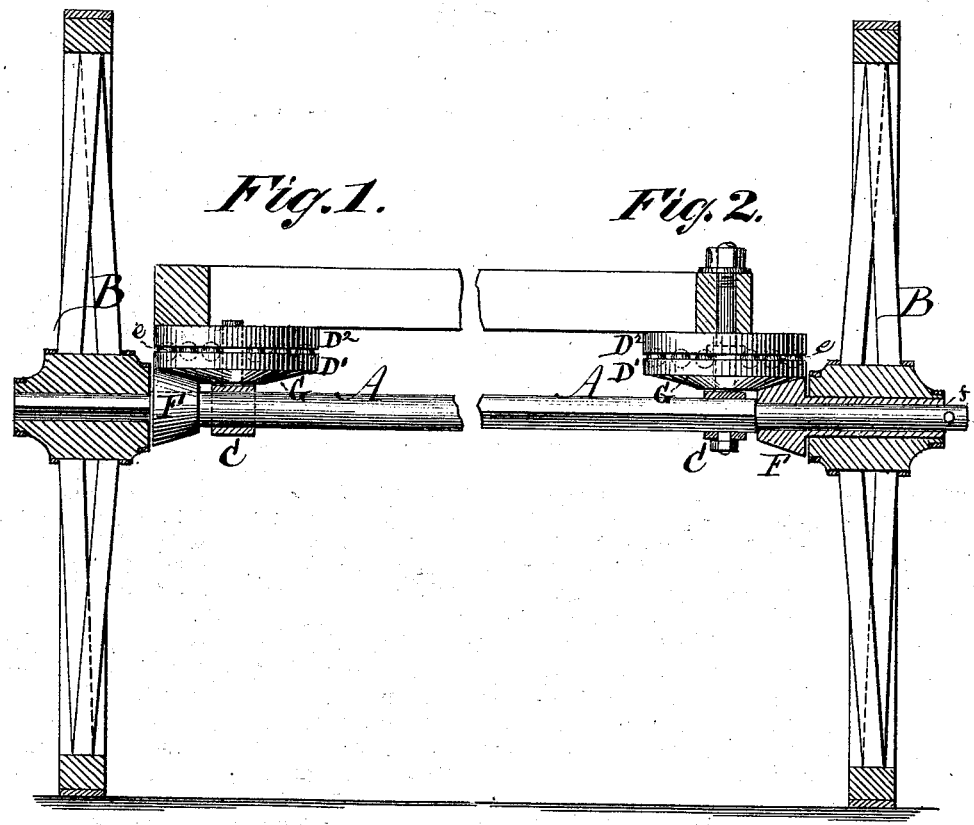
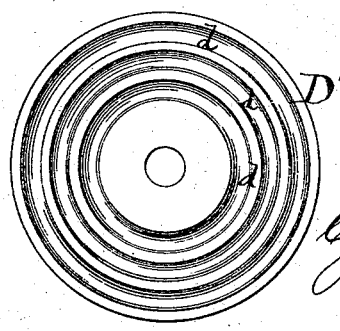
Witnesses.
John Becker.
Fred. Haynes
C. J. N. Rebour
by his Attorneys
Brown & Allen

UNITED STATES PATENT OFFICE.

CLAUDE J. N. REBOUR, OF PARIS, FRANCE, ASSIGNOR TO KARL KLEINPELL, OF ROTHHAUS, BADEN, AND LEOPOLD DRAMBURG, OF RAINEY, NEAR PARIS, FRANCE.

IMPROVEMENT IN CAR-TRUCKS.

Specification forming part of Letters Patent No. 154,280, dated August 18, 1874; application filed July 18, 1874.

*To all whom it may concern:*

Be it known that I, CLAUDE JOSEPH NAPOLEON REBOUR, of Paris, in the Republic of France, have invented certain Improvements in Boxes and Bearings for Journals and Axles, of which the following is a specification:

This invention relates to an improvement in bearings designed more particularly for application to the axles of railway and other carriages, though they may be applied to journals and shafts in various kinds of machinery.

The invention consists in the combination, with the axle or journal and its box, of two friction-cones, a pair of disks formed with annular grooves, and a number of balls, the whole arranged and operating in the manner and for the purpose hereinafter particularly described and set forth.

In the accompanying drawing, Figure 1 is a sectional view of a revolving axle with the wheel attached, so as to revolve therewith. Fig. 2 is a sectional view of a fixed axle, with the wheel arranged to revolve independently thereof. Fig. 3 is a transverse section of one of the disks. Fig. 4 is a face view of the same.

The axle A (shown in Fig. 1) is cylindrical in form, except the portion attached to the wheel B, which portion is angular, so that the wheel revolves with the axle. The axle A is attached to the body of the vehicle by means of a bolt, C, in the lower end of which is an eye, through which the axle passes and in which it revolves. The upper portion of the bolt C passes through the center of a disk, $D^1$, which turns loosely on the bolt, and also through the center of a disk, $D^2$, which is attached to the body of the vehicle, so as to prevent it from turning. The inner faces of the disks $D^1$ $D^2$ have annular grooves $d$ formed in them for the reception of balls $e$. There may be any desired number of grooves, according to the diameter of the disk, and the size of the balls may be varied at pleasure. On the axle A, between the bolt C and the hub of the wheel B, is a cone, F, formed with the axle or attached thereto, so as to revolve therewith.

The under surface of disk $D^1$ is formed into a cone, G, so as to correspond with the face of the cone F, and rests thereon, so that, as the axle revolves, the friction of the cones causes the disk $D^1$ to revolve, the balls $e$ allowing it to move freely under the upper disk $D^2$, and thus the friction is divided between the bolt C, cone F, disks $D^1$ $D^2$, and balls $e$.

When the improvements are applied to a revolving axle one of the wheels may be arranged to turn independently of the axle, in order to facilitate the motion and prevent friction in going around a curve.

When the parts are arranged as shown in Fig. 2 the axle is angular in form, and is fixed to the body of the vehicle, so as not to revolve, by means of a bolt, C, passing through the disks $D^1$ $D^2$ in the manner before described, so as to allow the lower disk to revolve. The cone F, in this case, is formed with an elongated hollow shaft, $f$, surrounding the journal of the axle A, and turning freely thereon, but fixed to the hub of the wheel B, so as to revolve therewith. As the wheel revolves the operation of the cones, disks, and balls is the same as before described.

This invention may be applied to vehicles of various kinds, such as railway-cars, wagons, or gun-carriages, in which latter case the result will be the taking up of the recoil to a great extent. The invention may also be applied to shafting of machinery in general by a suitable arrangement of parts.

What I claim as new, and desire to secure by Letters Patent, is—

The combination, with a journal, of the friction-cones F G, grooved disks $D^1$ $D^2$, and balls $e$, interposed between the disks, in the manner and for the purpose shown and described.

In testimony that I claim the foregoing I have hereunto set my hand this 28th day of March, 1874.

N. REBOUR.

Witnesses:
   C. KLEINPELL,
   DRAMBURG.